(12) United States Patent
Chen et al.

(10) Patent No.: US 8,417,798 B2
(45) Date of Patent: Apr. 9, 2013

(54) DEPLOYING ARTIFACTS FOR PACKAGED SOFTWARE APPLICATION IN CLOUD COMPUTING ENVIRONMENT

(75) Inventors: Shyh-Kwei Chen, Chappaqua, NY (US); Maharshi H. Desai, Fairfax, VA (US); Juhnyoung Lee, Yorktown Heights, NY (US); Rakesh Mohan, Cortlandt Manor, NY (US); Ajay Satsangi, Charlotte, NC (US); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/777,684

(22) Filed: May 11, 2010

(65) Prior Publication Data

US 2011/0283194 A1 Nov. 17, 2011

(51) Int. Cl.
*G06F 15/177* (2006.01)
(52) U.S. Cl.
USPC ............ 709/220; 709/203; 709/217; 709/226
(58) Field of Classification Search .................. 709/203, 709/217, 220, 226
See application file for complete search history.

(56) References Cited

U.S. PATENT DOCUMENTS

| | | | |
|---|---|---|---|
| 4,371,075 A | 2/1983 | Erlichman |
| 5,041,396 A | 8/1991 | Valero |
| 5,343,527 A | 8/1994 | Moore |
| 5,487,141 A | 1/1996 | Cain et al. |
| 5,566,330 A | 10/1996 | Sheffield |
| 5,652,835 A | 7/1997 | Miller |
| 5,724,589 A | 3/1998 | Wold |
| 5,737,727 A | 4/1998 | Lehmann et al. |
| 5,880,675 A | 3/1999 | Trautner |
| 5,884,079 A | 3/1999 | Furusawa |
| 5,956,708 A | 9/1999 | Dyko et al. |
| 5,965,858 A | 10/1999 | Suzuki et al. |
| 5,987,443 A | 11/1999 | Nichols et al. |
| 6,018,731 A | 1/2000 | Bertrand et al. |
| 6,256,773 B1 | 7/2001 | Bowman-Amuah |
| 6,305,548 B1 | 10/2001 | Sato et al. |
| 6,311,316 B1 | 10/2001 | Huggins et al. |
| 6,427,230 B1 | 7/2002 | Goiffon et al. |
| 6,606,740 B1 | 8/2003 | Lynn et al. |

(Continued)

OTHER PUBLICATIONS

Dellby et al., Optimized Quadrupole-Octupole C3/C5 Aberration Corrector for STEM, Proceedings of the Seventh International Conference on Charged Particle Optics, Physics Procedia, 2008, 179-183, 1.

(Continued)

*Primary Examiner* — Liangche A Wang
(74) *Attorney, Agent, or Firm* — Scully, Scott, Murphy & Presser, P.C.; William Stock, Esq.

(57) ABSTRACT

Deploying artifacts and tools in cloud computing environment for provisioning packaged software applications generates a user interface code automatically and dynamically using information from at least structural data representations of cloud computing environment and base configuration requirements for running one or more packaged software applications in the cloud computing environment. In one aspect, the automatically generated code may be augmented using one or more library codes and auxiliary files. Specific configuration requirements are further obtained by running the automatically generated user interface code. One or more components to deploy in the cloud computing environment are determined that meet the base configuration requirements and the specific configuration requirements, by analyzing the structural data representations.

21 Claims, 5 Drawing Sheets

U.S. PATENT DOCUMENTS

| | | | |
|---|---|---|---|
| 6,736,903 | B2 | 5/2004 | Minazzoli |
| 6,738,156 | B1 | 5/2004 | Simpson et al. |
| 6,836,841 | B1 | 12/2004 | Wu et al. |
| 6,851,104 | B1 | 2/2005 | da Silva |
| 6,904,449 | B1 | 6/2005 | Quinones |
| 6,907,546 | B1 | 6/2005 | Haswell et al. |
| 6,959,268 | B1 | 10/2005 | Myers et al. |
| 6,961,918 | B2 | 11/2005 | Garner et al. |
| 2002/0069137 | A1 | 6/2002 | Hiroshige et al. |
| 2002/0194053 | A1 | 12/2002 | Barrett et al. |
| 2003/0145006 | A1 | 7/2003 | Dalfsen et al. |
| 2005/0131941 | A1 | 6/2005 | Dettinger et al. |
| 2005/0149343 | A1 | 7/2005 | Rhoads |
| 2007/0178501 | A1* | 8/2007 | Rabinowitz et al. ............ 435/6 |
| 2007/0276714 | A1 | 11/2007 | Beringer |
| 2009/0249284 | A1* | 10/2009 | Antosz et al. ............ 717/104 |
| 2011/0093792 | A1* | 4/2011 | Frayman et al. ............ 715/752 |
| 2011/0246913 | A1* | 10/2011 | Lydick et al. ............ 715/762 |
| 2012/0030559 | A1* | 2/2012 | Manion et al. ............ 715/234 |

OTHER PUBLICATIONS

Frakes et al., Software Reuse and Reusability Metrics and Models, 1996, pp. 1-32.

Davis et al., Dialogue Specified Reuse of Domain Engineering Work Products, 1994, pp. 28-36.

Glushko, Patterns and Reuse in Document Engineering, 2002, pp. 1-13, file://C:\Documents%20and%20Settings\glushko\My%20Documents\xml%20conference.

Boukottaya et al., Document Reuse Tool for Communities of Practice, E. Tomadaki and P. Scott (Eds.): Innovative Approaches for Learning and Knowledge Sharing, EC-TEL 2006 Workshops Proceedings, ISSN 1613-0073, p. 235-244, 2006.

* cited by examiner

DEPLOYING ARTIFACTS FOR PACKAGED SOFTWARE APPLICATION IN CLOUD COMPUTING ENVIRONMENT

BACKGROUND

The present disclosure relates generally to computer applications, and more particularly to managing information relating to the deployment of packaged software applications. One example of a packaged software application is an enterprise resource planning (ERP) application, a company-wide computer software system used to manage and coordinate all the resources, information, and functions of an organization from shared data stores. An ERP service project is a complex activity relating to the deployment of packaged software application, which involves months or years of effort from many consultants. Consultants in such projects often rely on a large amount of various documents as the primary means to gather and share information and knowledge, often by using office productivity tools such as document editors, spreadsheet tools, drawing and presentation tools. Information stored using such tools are difficult to reuse, and often the data created and stored using those tools are difficult to compile. For example, the productivity tools do not provide any way to access, collate and report on the information.

BRIEF SUMMARY

A system and method of deploying artifacts and tools in cloud computing environment for provisioning packaged software applications are provided. The method, in one aspect, may include obtaining structural data representations of a cloud computing environment and configuration requirements for running one or more packaged software applications in the cloud computing environment. The method may also include generating automatically, using a processor, a user interface code using information from the structural data representations.

A system for deploying artifacts and tools in cloud computing environment for provisioning packaged software applications, in one aspect, may include a processor and structural data representations of cloud computing environment and base configuration requirements for running one or more packaged software applications in the cloud computing environment. The system may also include a user interface code dynamically generated from the structural data representations. The user interface code may be operable to accept specific configuration requirements for running one or more packaged software applications in the cloud computing environment. Program logic may be operable to determine one or more components to deploy in the cloud computing environment that meet the base configuration requirements and the specific configuration requirements, by analyzing the structural data representations.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
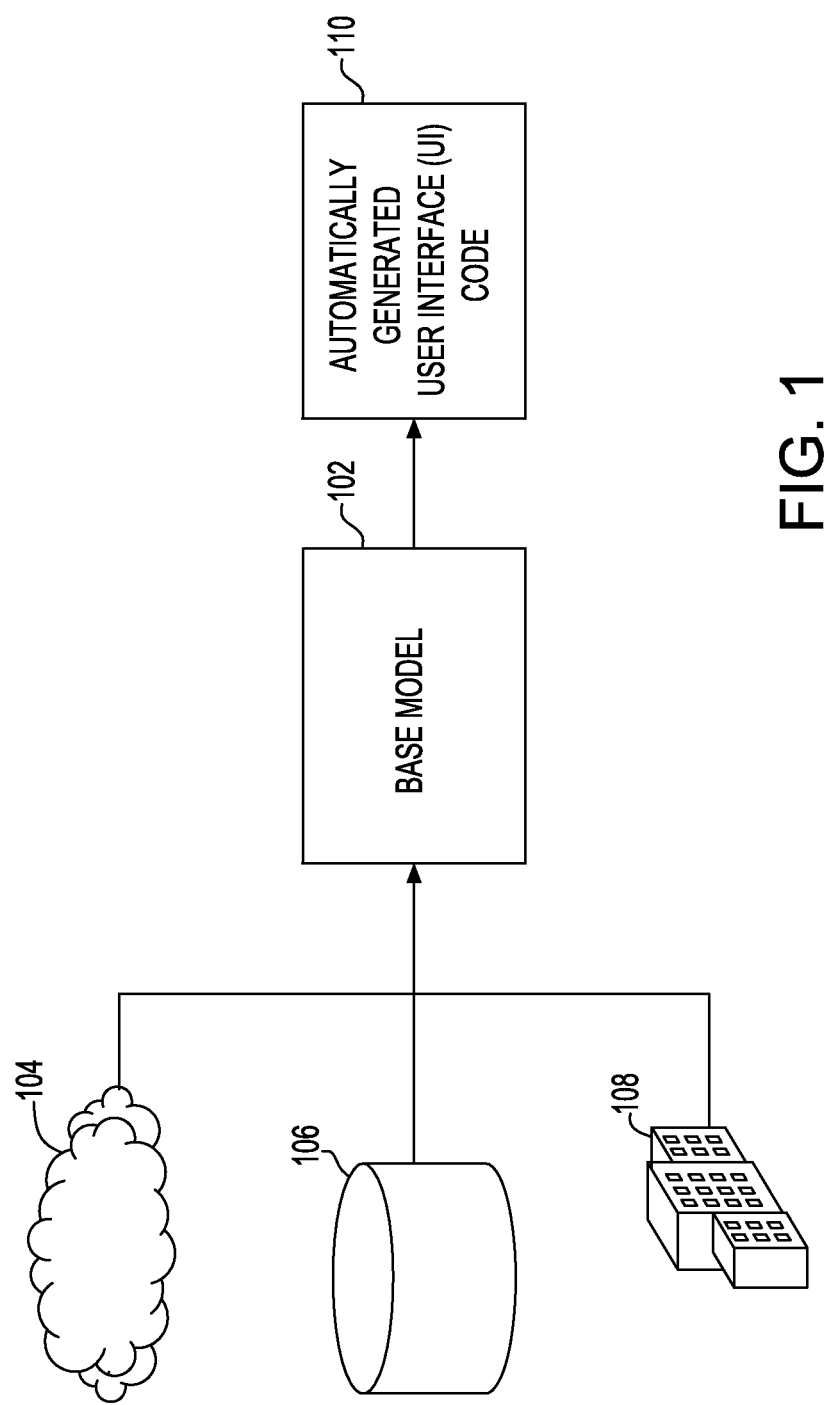
FIG. 1 is a block diagram illustrating a base model of the present disclosure in one embodiment, which is used to automatically generate a user interface code for provisioning of deploying artifacts in cloud computing environment.

The present disclosure relates to deploying software applications and hardware components in a cloud computing environment for companies, enterprises or the like. Some companies and/or enterprises contract out for information technology (IT) services from other companies (referred to herein as "service companies"), instead of owning and maintaining their own IT. The service companies in turn provide the IT services, for instance, by using "data centers" or "server farms". The IT services may include development (if any), installation, configuration, integration, support, and maintenance of the IT for the companies. Data centers, server farms, or the like are facilities used to house computer systems and associated components, such as telecommunications and storage systems. The facilities generally include computer system components needed to provide the services, redundant or backup power supplies, redundant data communications connections, environmental controls (e.g., air conditioning, fire suppression), security devices, and others needed for IT infrastructure. Software application can be deployed, installed, configured and run on such computer infrastructure and systems for different customers. "Cloud" may be implemented in data centers or server farms, i.e., computer infrastructure and systems where software application can be deployed or otherwise installed, configured and run, wherein the details of the servers are hidden and abstracted to the view of the customers, i.e., the companies contracting out for the services. Similarly, cloud computing refers to computing in which various services and tasks are provided by resources distributed, for example, on the Internet.

Software deployment includes all of the activities that make a software system available for use, and may include installation and configuration of various software components. For instance, "packaged application practices," includes deploying software modules associated with a packaged application or a suite of software. For example, enterprise resource planning (ERP) applications such as SAP™, Oracle™ and others may be deployed on a company's infrastructure, system and/or the like, utilizing the methodologies described herein.

The present disclosure describes a tool or utility for provisioning components needed for providing customized IT services for specific customers in the cloud environment. The provisioning of the components includes determining or selecting the needed hardware and software components available in the cloud environment and building a virtual machine or the like that is catered to provide the specific service requested by the customer and according to the customer's hardware and system requirements.

The present disclosure describes modelizing or externalizing the real world items or components into objects containing information and links between or among the objects, referred to herein as a model. The objects are computer data structures that structurally represent the real-world items or components and their relationships. Those objects can be rendered into a concrete form for example, in extended markup language (XML) form, Unified Modeling Language™ (UML) form, and/or others. The model is used to automatically generate a user interface program, which is a front-user code for provisioning of the deployment of software application in the computing cloud. For example, the information in the model is used by a front-end user interface to dynamically present the available components in the cloud and match them to the configuration and requirements of the specific customer. The automatically generated user interface program may be further refined by the customer. At run time, the user interface program accepts customer requirement specific inputs. Based on the inputs, provisioning logic of the present disclosure determines resource allocations (such as software and hardware components to deploy) that best suit the customer's requirements.

FIG. 1 is a block diagram illustrating a base model of the present disclosure in one embodiment, which is used to automatically generate a user interface code for provisioning of deploying artifacts in cloud computing environment. Artifacts refer to software, hardware, computer data files. A base model 102 may be defined and/or generated, and includes information about various hardware and software components in the cloud or cloud computing environment 104, which are available for provisioning, in structured data format. For instance, the information associated with various components in the cloud are extracted or obtained, and stored in structural data form, also referred to as a model (e.g., objects and links). The information may include data related to the type of processors, operating system, database, web applications, application servers and others, the configuration information about those components such as the size of random access memory (RAM), processing speed of a processor, database size, table names, and other. An example format in which the model may be stored is XML (extended markup language).

The base model 102 also defines or includes information about client functionality and requirements 106, in structured data format. These include platform-independent values specifying company functionality and behavior (as requirements) with precise representation of company procedures and rules. Example information about functionality and requirements 106 may include, but is not limited to, what is to be done with the software or packaged application software to be deployed, how the software or packaged application software should be deployed for the particular company, etc. The base model 102 may be generated automatically, for example, using methodologies such as those shown in U.S. patent application Ser. No. 12/575,163 filed Oct. 7, 2009, the content of which is incorporated herein by reference in its entirety.

The base model 102 further may define or include information about previous knowledge on software application deployments, benchmark data and the like 108, in structured data format. This information may include requirements for various projects. The information may be extracted, for example, from previously recorded or historical data relating to projects that have been provisioned before, a priori knowledge of different projects, for instance, from experts, benchmark data relating to different projects, the information about the best or leading practices collected in repositories, and others. For instance, requirements and configuration data for deploying software applications for various projects are converted into an object-link model form, and for example, stored as an XML file. Examples of such data may include, but are not limited to, the size of random access memory (RAM), processing speed of a processor, database size, table names, and other hardware requirements and software configuration parameters, for instance, that a software application may require in order to properly deploy and run the software application.

The base model 102 may be built by typing-in or otherwise entering data into an editor such as the XML editor and creating the XML file. The data may also be entered into different file format, e.g., an Excel™ file, and an automatic tool may be used to convert or translate the Excel file data into the XML format or other model format.

As described above, the base model 102 represents in structural data form hardware and software, for example, the entire stack from operating system to web application servers to applications, which will specify all the system prerequisite information of the components, configuration information of the components, integration information across the components if needed, and links among them specifying how they are related and how they affect each other depending on their assigned values.

The information so modeled may be used to automatically and dynamically generate user interface (UI) code and/or forms 110 or the like that provide the users with different options for system configurations that are appropriate for the user defined requirements for the user's project. For instance, an Eclipse™ Modeling framework (EMF) can use the information in the model to automatically and dynamically generate UI code and other applications (e.g., application programming interface (API)) capable of presenting the system configuration and parameter information to the user for a project. The model may be used repeatedly for different projects and also may be updated with new or updated information as more projects are provisioned and/or as new or more information is obtained. For example, the updated model may be used for generating UI code and/or other applications for provisioning a project. The model may be updated and/or used for provisioning another project, by again automatically creating the UI code (or API or the like) based on the updated model. The generated UI code and/or other applications are dynamic in that the code may change as the model is changed, for instance, as different projects are deployed. EMF is a modeling framework and code generation facility for building tools and other applications based on a structured data model. From a model specification described in XMI, EMF provides tools and runtime support to produce a set of Java classes for the model, along with a set of adapter classes that enable viewing and command-based editing of the model, and a basic editor.

The following is an example model stored in XML format. This XML document is an XML schema which describes the structure of XML documents which in turn specify a platform-independent, cloud computing model capturing the objects, attributes, company functionality and behavior of the program code that will be generated to support the provision of software application components in a cloud environment. In this particular example, the XML schema defines the practice, client, project, appliance (one or more software images or installation related files), platform, software application, and their types and attributes, parameters in the model. A UI code may be automatically generated from this model. The UI code that is generated displays the objects and their attributes and accepts user values.

```xml
<?xml version="1.0" encoding="UTF-8"?>
<xsd:schema xmlns="http://www.acme.com/schemas/cloud"
xmlns:xsd="http://www.w3.org/2001/XMLSchema"
targetNamespace="http://www.acme.com/schemas/cloud"
elementFormDefault="qualified" attributeFormDefault="unqualified">
    <xsd:element name="Practice">
        <xsd:complexType>
            <xsd:complexContent>
                <xsd:extension base="PracticeType"/>
            </xsd:complexContent>
        </xsd:complexType>
    </xsd:element>
    <xsd:complexType name="PracticeType">
        <xsd:annotation>
            <xsd:documentation>A service pratice providing
                cloud computing
for client engagement project</xsd:documentation>
        </xsd:annotation>
        <xsd:sequence>
            <xsd:element name="PracticeParameter1"/>
            <xsd:element name="PracticeParameter2"/>
            <xsd:element name="PracticeParameter3"/>
        </xsd:sequence>
    </xsd:complexType>
    <xsd:element name="Client">
        <xsd:complexType>
            <xsd:complexContent>
                <xsd:extension base="ClientType"/>
            </xsd:complexContent>
        </xsd:complexType>
    </xsd:element>
    <xsd:complexType name="ClientType">
        <xsd:annotation>
            <xsd:documentation>A client</xsd:documentation>
        </xsd:annotation>
        <xsd:sequence>
            <xsd:element name="ClientParameter1"/>
            <xsd:element name="ClientParameter2"/>
            <xsd:element name="ClientParameter3"/>
        </xsd:sequence>
    </xsd:complexType>
    <xsd:element name="Project">
        <xsd:complexType>
            <xsd:complexContent>
                <xsd:extension base="ProjectType"/>
            </xsd:complexContent>
        </xsd:complexType>
    </xsd:element>
    <xsd:complexType name="ProjectType">
        <xsd:annotation>
            <xsd:documentation>A client engagement project using cloud
computing</xsd:documentation>
        </xsd:annotation>
        <xsd:sequence>
            <xsd:element name="ProjectParameter1"/>
            <xsd:element name="ProjectParameter2"/>
            <xsd:element name="ProjectParameter3"/>
        </xsd:sequence>
    </xsd:complexType>
    <xsd:element name="Appliance">
        <xsd:complexType>
            <xsd:complexContent>
                <xsd:extension base="ApplianceType"/>
            </xsd:complexContent>
        </xsd:complexType>
    </xsd:element>
    <xsd:complexType name="ApplianceType">
        <xsd:annotation>
            <xsd:documentation>Appliance for provisioning in cloud
computing</xsd:documentation>
        </xsd:annotation>
        <xsd:sequence>
            <xsd:element name="ApplianceParameter1"/>
            <xsd:element name="ApplianceParameter2"/>
            <xsd:element name="ApplianceParameter3"/>
        </xsd:sequence>
    </xsd:complexType>
    <xsd:element name="Platform">
        <xsd:complexType>
            <xsd:complexContent>
                <xsd:extension base="PlatformType"/>
            </xsd:complexContent>
        </xsd:complexType>
    </xsd:element>
    <xsd:complexType name="PlatformType">
        <xsd:annotation>
            <xsd:documentation>A platform where software application
components in the selected appliance will be
deployed</xsd:documentation>
        </xsd:annotation>
        <xsd:sequence>
            <xsd:element name="PlatformParameter1"/>
            <xsd:element name="PlatformParameter2"/>
            <xsd:element name="PlatformParameter3"/>
        </xsd:sequence>
    </xsd:complexType>
    <xsd:element name="SoftwareApplication">
        <xsd:complexType>
            <xsd:complexContent>
                <xsd:extension base="SoftwareApplicationType"/>
            </xsd:complexContent>
        </xsd:complexType>
    </xsd:element>
    <xsd:complexType name="SoftwareApplicationType">
        <xsd:annotation>
            <xsd:documentation>A software application component in an
appliance to be deployed in a selected platform</xsd:documentation>
        </xsd:annotation>
        <xsd:sequence>
            <xsd:element name="SoftwareApplicationParameter1"/>
            <xsd:element name="SoftwareApplicationParameter2"/>
            <xsd:element name="SoftwareApplicationParameter3"/>
            <xsd:element name="SoftwareApplicationParameter4"/>
            <xsd:element name="SoftwareApplicationParameter5"/>
            <xsd:element name="SoftwareApplicationParameter6"/>
            <xsd:element name="SoftwareApplicationParameter7"/>
        </xsd:sequence>
    </xsd:complexType>
</xsd:schema>
```

Figure 2:
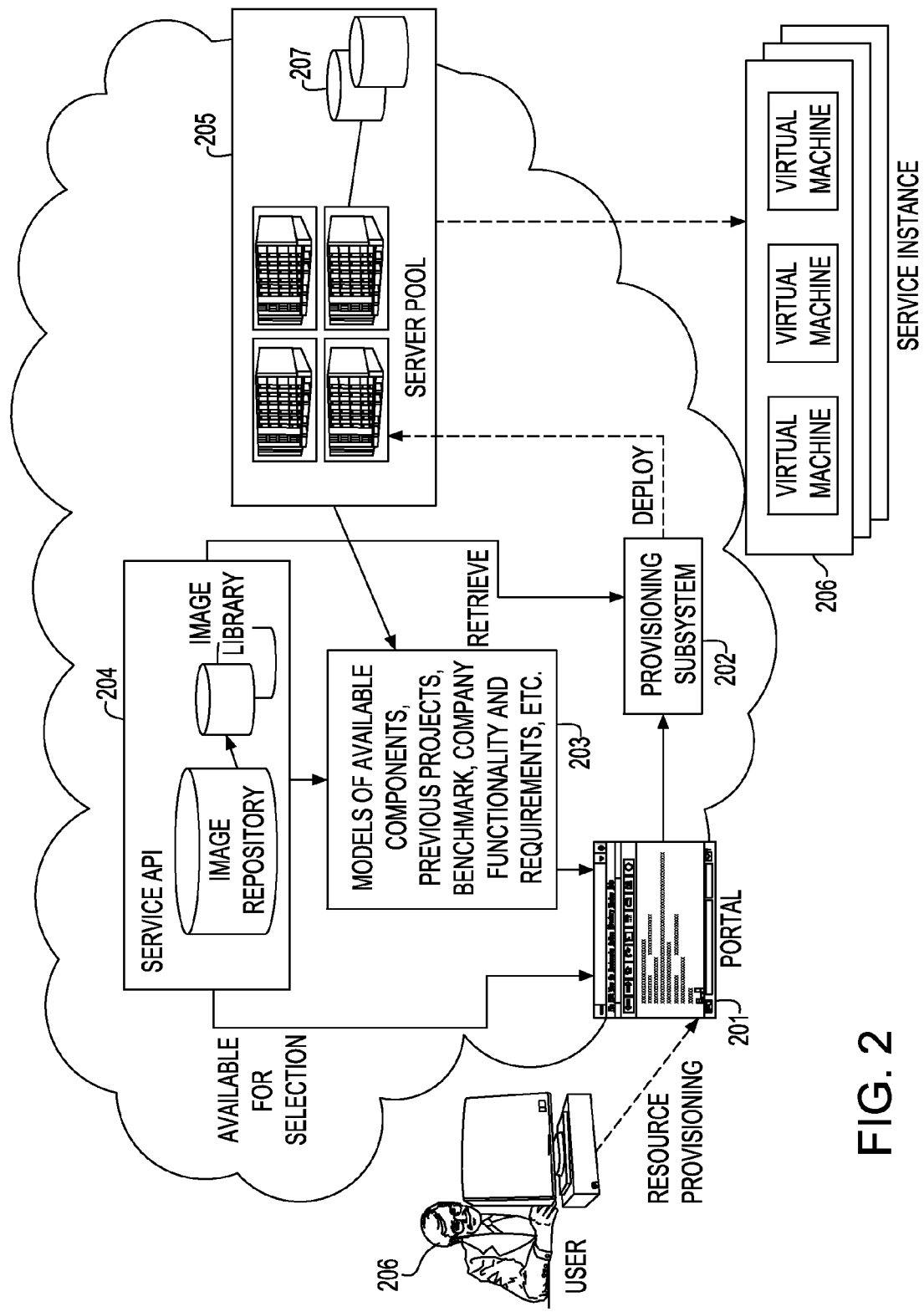
FIG. 2 is an architectural diagram that shows various system modules used for deploying software applications and associated hardware components in a cloud computing environment in one embodiment of the present disclosure.

FIG. 2 is an architectural diagram that shows deployment components of the present disclosure in one embodiment for deploying software applications and associated hardware components in a cloud computing environment. As described above with reference to FIG. 1, models 203 of the cloud computing components, company functionality and requirements, and previous projects and benchmark data include information about the computing components in the cloud, company functionality and requirements, and previous deployment projects. For instance, the server pool 205 and associated components, databases 207, firmware and software 204 such as operating systems, web servers, application servers, and other software applications may be all modeled. Collecting of this information about the components into representative models 203 may take place as each project is set up, progressively building on the model 203 with more information or additional components.

A portal UI 201 may present one or more forms created dynamically based on the information in the model 203, for instance, using an EMF™. UI refers to the user interface software used by the user to interact with the system logic or the like. A portal UI refers to the user interface that provides the user with a central place to interact with the system logic, for example, for resource allocation for software modules in a cloud environment. Web portal UI refers to the portal UI that runs on a Web browser rather than a proprietary (graphical) user interface.

The forms presented may include one or more questions and/or finable input fields. The user 206 may enter the answers to the questions and populate the input fields. The questions and input fields relate to values and parameters that may be used to determine which hardware and software components should be deployed to best suit the user's project. The user 206, for example, enters those values, making decisions as to the deploying of the specified software applications. The portal UI 201 may also present a list of components to deploy, which is dynamically generated based on the model 203, and from which the user 206 may select. The list may include optional configurations that the user can select from, a list of software modules that should be integrated together, and others.

The user-entered values thus define the specific configuration of a particular project. For instance, the user may provide information such as various user counts per tool domain, length of the project, high availability requirements, environment requirements, security requirements, backup and restore requirements, cost requirements, geographic distribution requirements, and others. The portal UI 201 may be a Web browser-based tool that may be entered by the user 206 by opening the appropriate URL (uniform resource locator) on a Web browser.

The logic in the portal UI 201 and/or the provisioning subsystem 202 may use the user input data and perform an analysis of the model 203 to determine the cloud computing components to deploy for the project as defined by the user entered requirements. The analytics may also take into account the models of previous projects, benchmark data and other modeled information to determine the cloud computing components to present to the user for deployment.

The model-based provisioning module or system 202 retrieves various software images (computer files needed for running software applications). The model-based provisioning module or system 202 also requests resources from a server pool 205 that includes various hardware components in one or more data centers. For example, hardware components needed to meet the requirements for the project specified by the user are retrieved. Thus, the model-based provisioning module or system 202 fulfills the user-entered requirements for the project by installing and configuring the selected software applications 204 on the hardware servers 205.

The model-based provisioning module or system 202 creates one or more virtual machines (VM) 206 that are able to handle the requirements entered by the user. The VM 206 represents actual installation of the components with the necessary modifications of the parameter values for configuration. The VM 206 can be installed on one or more physical hardware servers 205 in data centers.

Figure 3:
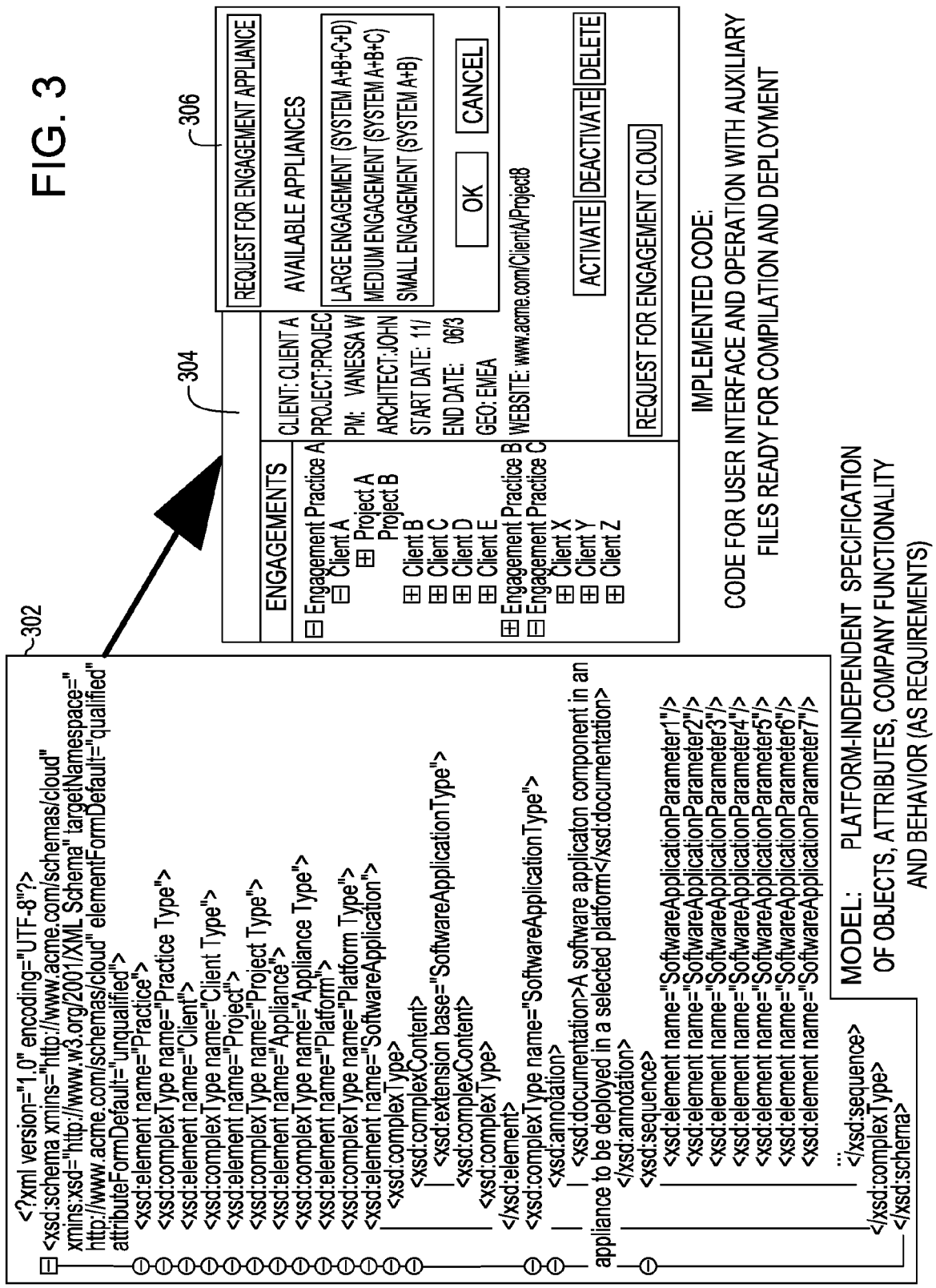
FIG. 3 shows an example model and a dynamically generated portal user interface in one embodiment of the present disclosure.

FIG. 3 shows an example model and a dynamically generated portal UI in one embodiment of the present disclosure. A model representing platform-independent specification of components, attributes, company functionality and behavior (as requirements) 302 is shown, from which a UI code may be automatically generated for deployment. The automatically generated UI code generates the user interface at 304 when the code is run and helps the user manipulate the values of the objects and attributes through the user interface 304. The user may populate the input fields and answer the questions on the user interface form. A pop up menu 306 or the like shows a list of software components that can be selected.

Figure 4:
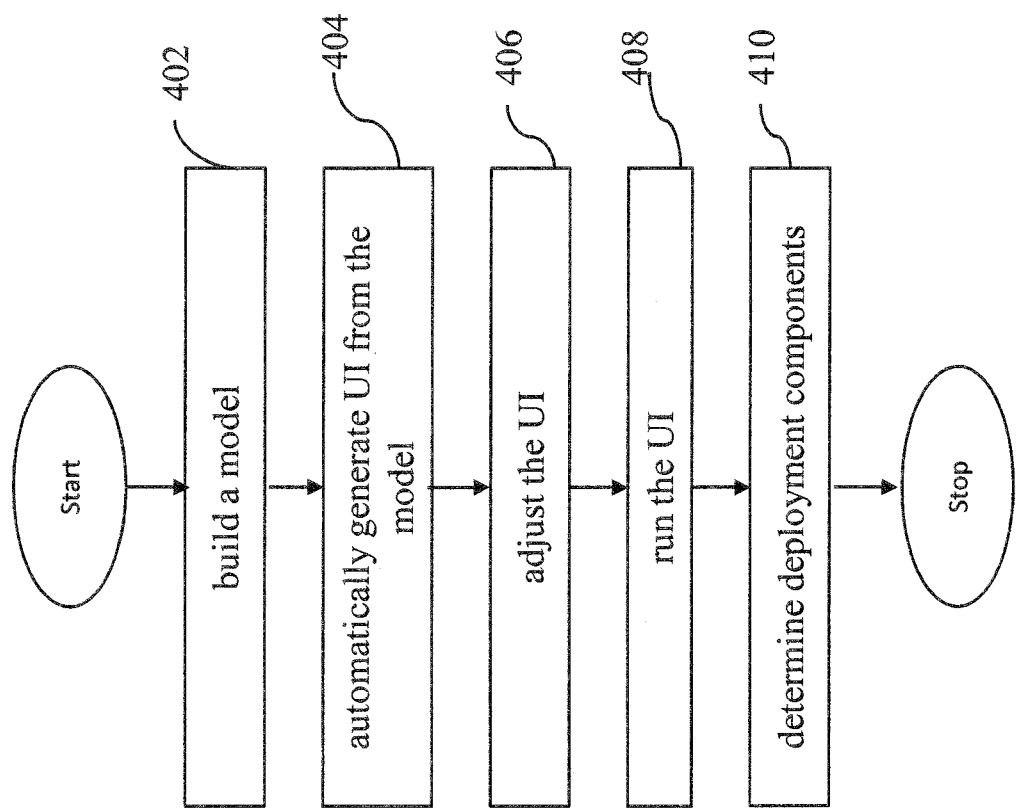
FIG. 4 is a flow diagram illustrating a method of deploying software applications in a computing cloud according to one embodiment of the present disclosure.

FIG. 4 is a flow diagram illustrating a method of deploying software applications in computing cloud according to one embodiment of the present disclosure. The internal processing steps shown in FIG. 4 may be performed by the portal UI and/or the logic in the provision subsystem shown in FIG. 2 at 201 and 202 respectively, utilizing various functional modules shown in FIG. 2. Referring now to FIG. 4, at 402, a model is built. The model as described with reference to FIG. 1, for example, represents in structured data format the information about the cloud computing components and configurations, company functionality and requirements, and previous knowledge about previous projects and software application deployments and related benchmark data. The model may also include other information.

At 404, a user interface program is automatically generated based on the information in the model. The automatically generated UI program, for example, presents a UI form or the like that is dynamically generated based on the model and that further presents appropriate questions and input fields for the user to answer, populate or select. A model-driven architecture (MDA) tool such as EMF™ tool that can generate a UI code or other application codes based on XML or the like data may be utilized to automatically and dynamically generate the UI program.

At 406, the user may adjust or modify the UI program to meets the user's needs. For instance, when the EMF™ or the like mechanism automatically generates a user interface and operations manipulating the objects and their attributes specified in the model, it may provide basic get and set operations along with primitive user interface. This provides a starting point for the user to define more sophisticated and high-level programming interfaces. Also, the user can refine the user interface operations and also integrate the newly defined system with the other systems easily. Additionally, the user may add any platform-specific information to the model or the UI code at this point, for example, so that the performance of the generated code deployed in the particular platform will be optimized.

The UI program may be further refined to provide more high-level operations on the objects and attributes, user-friendlier user interface, and additional utilities such as data validity check. Also they may be optimized for performance by additional customization on platform-specific attributes for the particular platform of the provisioning system. Further cosmetic changes, style and look-and-feel changes may be added.

At 408, the automatically generated UI code runs and presents the dynamically generated information about the company functionality and its requirements, and also prompts the user for input values. Input values that the user may enter may include, but are not limited to, the speed of the processor, the size of RAM, operating system such as Linux™ or Windows™ or others, component-specific configurations such as database size, table names, and others, that the user desires for running the packaged software applications. The automatically generated user interface may also present a menu of software modules, items or components the user can select from possible set of components to deploy.

At 410, based on the user input in step 408, i.e., various data parameters and selected software modules, items, and/or components, provisioning subsystem logic of the present disclosure further queries and analyzes the model, and determines one or more sets of components in the cloud computing that the user should deploy to meet the defined configuration requirements. The one or more sets of components may include, but are not limited to, various software components that should be integrated together that meet the user defined configuration requirements, various hardware and firmware components that likewise can be used for running the various software components, and the like. For instance, for the selected software module, the logic of the present disclosure tries to determine the optimal allocation of computing resources with the optimal configuration, e.g., central processing unit (CPU), memory, servers, platforms, and others. Further, auxiliary files are put together and ready for compilation and deployment, for instance, linking with legacy or other code, if needed. In this determining process, the logic of the present disclosure utilizes the information captured in the model.

The deployment then can take place using the automatically generated code and auxiliary files. In addition, information about this instance of deployment may be saved in the similar model format, for instance, in an XML format or the like. Such models may be used to generate progress reports, for example, for project management and monitoring.

In addition, the information about this instance of deployment saved as one or more models may be used to generate documents that specify the deployment procedure, which the user can view or use. Those documents can be used as requirement documents and guides for deploying packaged software applications.

Further, script patches may be generated for a UI code in similar manner, in which a patch model is built and UI from the patch model is automatically generated as script patches.

As described above, the UI may be a web-enabled or web-browser enabled user interface. For instance, a user may open or enter the UI by accessing the appropriate uniform resource locator (URL) associated with the UI code.

The steps shown in FIG. 4 need not be performed all together. For instance, model generating step may have been performed previously, unrelated to the session for automatically generating a UI code and running the generated UI. Even yet, the model generating step may be performed incrementally, adding information to the model, independent of the UI code generating and running steps. Likewise, the UI code generating step and adjusting step may be performed at different times than the UI run-time steps of 408 and 410.

The cloud computing in one embodiment may be based on Research Compute Cloud-e (RC2-e), Vega, and Mirage research technologies. RC2-e serves as a "living lab" to showcase early unproven Research Technologies in context of the Research Compute Cloud. Vega Provisioning manager provides a provisioning abstraction layer to support a standard image based deployment across a multiple target virtualization technologies. It supports both single and composite server images and provides documented way for creating images for deployment. It provides a uniform mechanism to rapidly provision complex topologies using virtual images. Mirage Image repository treats images as structured data, not machines. It performs IT operations on views of images, exploits redundancy among large numbers of images and maintains image relationships. It provides efficient storage, simplified, faster image maintenance, and faster image search, image mobility through demand fetch.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
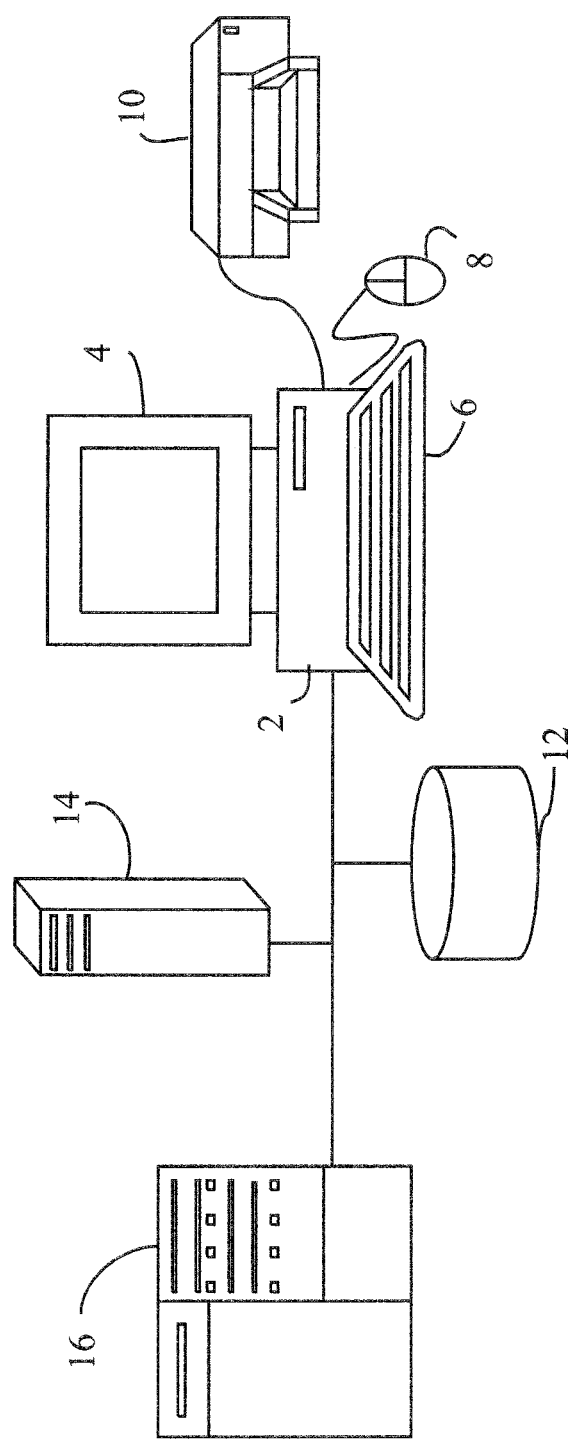
FIG. 5 illustrates an example of a computer system, in which the systems and methodologies of the present disclosure may be carried out or executed.

Referring now to FIG. 5, the systems and methodologies of the present disclosure may be carried out or executed in a computer system 2 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 16, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of deploying artifacts and tools in cloud computing environment for provisioning packaged software applications, comprising:
   obtaining structural data representations of cloud computing environment and base configuration requirements for running one or more packaged software applications in the cloud computing environment;
   generating automatically, using a processor, a user interface code using information from the structural data representations, the user interface code for deploying packaged software applications into the cloud computing environment;
   determining one or more components to deploy in the cloud computing environment that meet the base configuration requirements and one or more specific configuration requirements, by analyzing the structural data representations;
   obtaining the one or more specific configuration requirements by executing the automatically generated user interface code,
   wherein the structural data representations and the determined one or more components to deploy are used to generate a report of deployment procedures.

2. A method of deploying artifacts and tools in cloud computing environment for provisioning packaged software applications, comprising:
   obtaining structural data representations of cloud computing environment and base configuration requirements for running one or more packaged software applications in the cloud computing environment;
   generating automatically, using a processor, a user interface code using information from the structural data representations, the user interface code for deploying packaged software applications into the cloud computing environment;
   determining one or more components to deploy in the cloud computing environment that meet the base configuration requirements and one or more specific configuration requirements, by analyzing the structural data representations;
   obtaining the one or more specific configuration requirements by executing the automatically generated user interface code,
   wherein the structural data representations and the determined one or more components to deploy are used to generate a requirement documents specifying deployment procedures.

3. The method of claim 2, wherein the structural data representations further include information associated with a priori knowledge of previous deployments of the packaged software applications.

4. The method of claim 2, wherein the structural data representations further include information associated with industry benchmark data associated with deployment of the packaged software applications.

5. The method of claim 2, further including:
   adjusting the generated user interface code to include additional functions.

6. The method of claim 2, further including:
   adjusting the generated user interface code to include user-friendly look-and-feel.

7. The method of claim 2, wherein the structural data representations further include information associated with a priori knowledge of previous deployments of the packaged software applications.

8. The method of claim 2, wherein the structural data representations further include information associated with industry benchmark data associated with deployment of the packaged software applications.

9. The method of claim 2, wherein the user interface code includes web-enabled user interface code.

10. The method of claim 2, wherein the structural data representations are expressed in one or more of XML format, UML format, or combinations thereof.

11. The method of claim 2, further including updating the structural data representations.

12. The method of claim 2, wherein the structural data representations are used to generate patch scripts to the user interface code.

13. A system for deploying artifacts and tools in cloud computing environment for provisioning packaged software applications, comprising:
   a processor;
   structural data representations of cloud computing environment and base configuration requirements for running one or more packaged software applications in the cloud computing environment;
   a user interface code dynamically generated from the structural data representations, and further operable deploy one or more packaged software applications in the cloud computing environment; and
   program logic operable to determine one or more components to deploy in the cloud computing environment that meet the base configuration requirements and one or more specific configuration requirements, by analyzing the structural data representations,
   wherein the one or more specific configuration requirements are obtained by executing the dynamically generated user interface code and wherein the structural data representations and the determined one or more components to deploy are used to generate a requirement document specifying deployment procedures.

14. The system of claim 13, wherein the structural data representations further include information associated with a priori knowledge of previous deployments of the packaged software applications.

15. The system of claim 13, wherein the structural data representations further include information associated with industry benchmark data associated with deployment of the packaged software applications.

16. The system of claim 13, wherein the structural data representations and the determined one or more components to deploy are used to generate a report of deployment procedures.

17. The system of claim 13, wherein the user interface code include web-enabled user interface code.

18. The system of claim 13, wherein the structural data representations are used to generate patch scripts to the user interface code.

19. A computer readable storage medium storing a program of instructions executable by a machine to perform a method of deploying artifacts and tools in cloud computing environment for provisioning packaged software applications, comprising:

obtaining structural data representations of cloud computing environment and base configuration requirements for running one or more packaged software applications in the cloud computing environment;

generating automatically, using a processor, a user interface code using information from the structural data representations, the user interface code for deploying packaged software applications into the cloud computing environment;

obtaining specific configuration requirements by executing the automatically generated user interface code; and determining one or more components to deploy in the cloud computing environment that meet the base configuration requirements and the specific configuration requirements, by analyzing the structural data representations, wherein the structural data representations and the determined one or more components to deploy are used to generate a report of deployment procedures.

20. The computer readable storage medium of claim 19, wherein the structural data representations further include information associated with a priori knowledge of previous deployments of the packaged software applications and information associated with industry benchmark data associated with deployment of the packaged software applications.

21. The computer readable storage medium of claim 19, wherein the user interface code includes web-enabled user interface code.

* * * * *